Jan. 27, 1925. 1,524,541
J. B. DE KEIR
BAKER'S OVEN
Filed Sept. 8, 1921

WITNESSES
INVENTOR
JOHN B. DE KEIR
BY
ATTORNEYS

Patented Jan. 27, 1925.

1,524,541

UNITED STATES PATENT OFFICE.

JOHN B. DE KEIR, OF NEW YORK, N. Y.

BAKER'S OVEN.

Application filed September 8, 1921. Serial No. 499,284.

*To all whom it may concern:*

Be it known that I, JOHN B. DE KEIR, a subject of the King of Belgium, and a resident of the city of New York, borough of Manhattan, in the county and State of New York, have invented a new and Improved Baker's Oven, of which the following is a full, clear, and exact description.

This invention relates to ovens and refers more particularly to an improvement in the construction of bakers' ovens.

The invention contemplates a baker's oven which includes a plurality of oven units adapted to be heated by a common heating unit having a constant heat by means of which various relative degrees of heat in said oven units is obtained.

Some of the principal objects resulting from an oven construction of this character reside in the economy of fuel required, by the utilization of heat from the first oven unit to heat the successive oven units to lesser degrees, the simplicity of construction, and the efficiency of operation.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed and by variations in the phraseology of the same.

In the drawings—

Figures 1, 2:
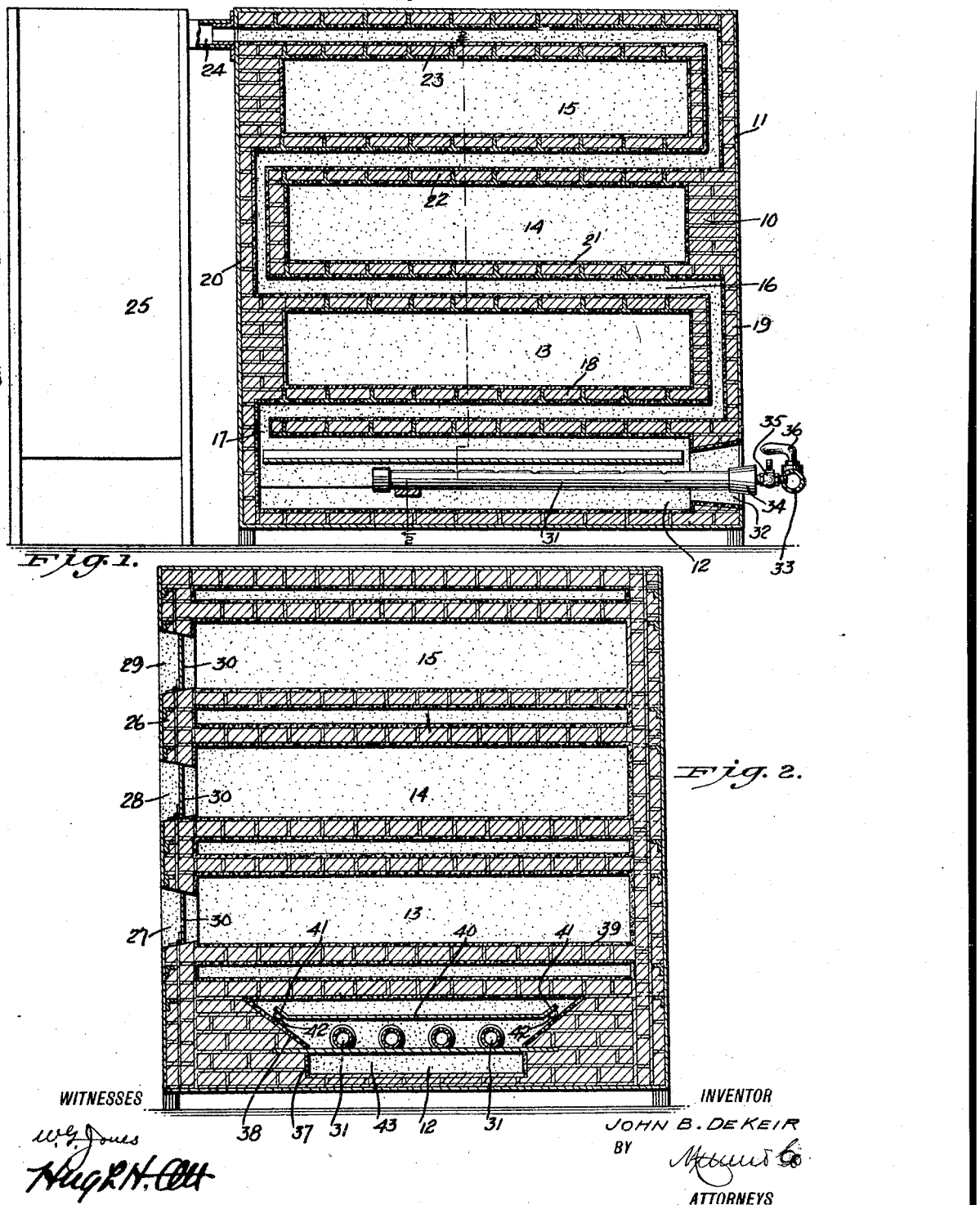
Figure 1 is a sectional view taken longitudinally of the oven.
Fig. 2 is a transverse sectional view therethrough taken approximately on the line 2—2 of Fig. 1.

Referring to the drawings by characters of reference, 10 designates the body of the structure which is preferably built up from brick having an exterior metallic covering 11. The body is provided adjacent its lower portion with a heating compartment 12 and a plurality of superposed oven units 13, 14 and 15. A sinuous conduit or heat conveying flue 16 has communication at its lower end as at 17 with the heating compartment 12 at one side thereof from which point it extends laterally in a horizontal plane to the opposite side of the body 10, through the wall 18 which separates the heating compartment 12 from the lowermost oven unit 13. The conduit or flue then extends vertically between the side wall 19 and laterally in a horizontal plane to the opposite side wall 20 through the horizontal wall 21 which separates the oven unit 13 from the oven unit 14. The flue extends vertically from this point through the side wall 20 and laterally through the horizontal wall 22 which separates the oven unit 14 from the oven unit 15. The flue or conduit then extends vertically through the side wall 19 and laterally through the top wall 23, thence outwardly through the side wall 20, where it communicates by a connecting pipe 24 with a warming cabinet 25. The front wall 26 of the oven body 10 is provided with a plurality of openings or doorways 27, 28 and 29 which respectively communicate with the oven units 13, 14 and 15, the same being closed by the doors 30, whereby when the doors are open access may be had to the interior of the oven units. Any suitable form of heating unit is adapted to be arranged within the heating compartment 12 and as here illustrated said heating unit consists of a plurality of burner pipes 31 arranged laterally in parallel relation and in a horizontal plane within the heating compartment with their outer extremities extending through an opening 32 in the side wall 19 and connected to a supply manifold 33 from which gas or oil is fed to the burner pipes. Preferably each burner pipe is provided with a mixing chamber 34 at its point of connection with the manifold and with a valve 35 whereby one or more of the burner pipes may be used in accordance with the demands. Preferably the manifold is provided with a main cut-off valve 36 by means of which the fuel supply is regulated or entirely cut off from the manifold 33. The front and rear walls of the heating compartment are provided with a vertical portion 37 and with an inclined portion 38 to provide the upper part of the compartment 12 of gradually increasing areas toward its upper wall. The heating compartment 12, the oven units 13, 14 and 15 and the flue or conduit 16 are preferably lined with fire brick 39 or a similar substance of this character. A deflector plate 40 having upwardly inclined flanges 41 at its forward and rearward edges corresponding to the inclination of the portions 38 of the front and rear walls of the heating chamber 12 is provided, said flanges 41 being provided at their under sides with spacing feet 42 to support the deflector plate in a horizontal plane above the burner pipes 31. The extreme inner free extremities of the burner pipes are preferably supported by the metallic strap 43 which extends through the compartment 12 from front to rear.

In use and operation of the oven, when the burner is lighted, the products of combustion in the heating compartment will travel therefrom into the conduit or flue 16 embracing the several oven units 13 on three sides to heat the same. It, of course, follows that the lowermost oven unit being disposed closest to the heating chamber will be heated to a higher degree of heat than the oven unit 14, and the oven unit 14 to a higher degree of heat than the oven unit 15, thereby providing an oven having various compartments with relatively different degrees of heat furnished by a common heating unit in which the heat is of a constant degree. The baker is thus afforded three or more compartments or oven units of various degrees of heat by means of which baked articles requiring different degrees of heat may be simultaneously operated upon by a common heating unit.

Having thus described my invention, what I claim is:

1. In a baker's oven of the character described, a heating chamber having upwardly and outwardly inclined walls, a plurality of burners in the chamber, and a deflector plate in the chamber above the burners and having upwardly and outwardly inclined edges corresponding to the inclination of the inclined walls of the heating chamber and provided with feet resting upon the inclined walls of the said heating chamber.

2. A baker's oven comprising a body including front, rear, side, top and bottom walls, a plurality of superposed horizontal walls defining individual ovens each having a doorway communicating therewith through the front wall of the body, and a subterposed heating chamber having a doorway through one of the side walls of the body, a heating conduit having communication with the heating chamber at one side thereof and extending alternately through the superposed horizontal partitions and the opposite side walls of the body, a warming cabinet at one side of the oven, and a pipe connecting the upper end of the heating conduit with the said cabinet.

3. A baker's oven comprising a body including front, rear, side, top and bottom walls, a plurality of superposed horizontal walls defining individual ovens each having a doorway communicating therewith through the front wall of the body and a subterposed heating chamber having a doorway through one of the side walls of the body, a heating conduit having communication with the heating chamber at one side thereof and extending alternately through the superposed horizontal partitions and the opposite side walls of the body, the said subterposed heating chamber having the upper portion of its front and rear walls inclined outwardly, a plurality of burners in the heating chamber, and a deflector plate above the burners and having its front and rear edges inclined outwardly to correspond to the inclination of the upper portion of the front walls of the heating chamber and provided with depending feet resting on the inclined wall of the heating chamber, as and for the purpose set forth.

JOHN B. DE KEIR.